April 22, 1947. L. H. BLANCHARD 2,419,248
MEANS AND METHOD FOR FITTING TEETH
Filed Nov. 28, 1944

INVENTOR.
Lloyd H. Blanchard
BY Charles R. Fay

Patented Apr. 22, 1947

2,419,248

UNITED STATES PATENT OFFICE 2,419,248

MEANS AND METHOD FOR FITTING TEETH

Lloyd H. Blanchard, Worcester, Mass.

Application November 28, 1944, Serial No. 565,441

1 Claim. (Cl. 32—8)

This invention relates to means and methods for fitting false teeth in such a way as to achieve exact fit of the dentures and to provide for natural excursive and protrusive jaw movements without interference between the upper and lower dentures.

Objects of the invention include the provision of means and method for fitting and making false teeth using a so-called "bite" plate which is applied in the mouth on a plastic base from which the gum impression is taken; and the application to said bite plate of new and novel bite blocks, in such a manner as to achieve optimum conditions for the patient and exact alignment and formation of the teeth so that natural jaw movements may be made without interference between the upper and lower dentures and with the utmost freedom of the wearer.

Other objects and advantages of the invention will appear hereinafter.

Reference is to be had to the accompanying drawings, in which

In the making of false teeth it has always been a problem to achieve correct location of the upper and lower dentures with relation to each other and another problem resides in making teeth which can perform the intended function of chewing while at the same time being of a nature to allow for the natural excursive and protrusive movements of the lower jaw without interference between the dentures and without locking or wedging the teeth together in such a way that the natural movements of the jaw are either inhibited or interfered with. This invention provides a method and means for determining the exact line which the biting and chewing surfaces of the teeth should assume and provides for the location of the false teeth on certain natural curves which have been determined.

The basis of the present invention resides in the "bite" plate indicated generally at 10. This plate may be made of any material and is of generally horse-shoe or U-shape similar to the shape of the jaws. The bite plate is used in the oral cavity and essentially is a locator to find and determine the correct location of the chewing surfaces of the teeth. When a plastic wax or plaster is applied to the lower jaw to take a gum impression, the bite plate is placed on the plaster and moved from side to side and back and forth until the dividing line of the projected teeth is determined. The plaster molds are then in correct relation between the teeth chewing surfaces and the jaws.

The bite plate possesses several characteristics essential to proper functioning for the purposes intended. It has been discovered that the excursive movement of the lower jaw is not plane but on the arc of a circle whose radius is located approximately in the top of the head. This radius is just about seven inches for the average adult. To provide for this swinging movement of the jaw, the bite plate is curved along the arc above mentioned as clearly shown in Fig. 3 at 12 and in dotted lines in Fig. 2.

Figure 2:
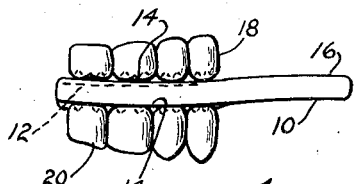
Fig. 2 is a side elevation of the parts of Fig. 1.

Also, the protrusion of the lower jaw is on an arc of a like circle but normal to the arc of excursion, and this curve also appears in the bite plate as at 14, Fig. 2. Since the front teeth are longer than the molars it is not necessary to continue this curve thereto, and this area of the teeth may be left flat or substantially so, see 16.

Prosthetic teeth applied to the bite plate will follow the compound curvature thereof and the teeth chewing surfaces will therefore allow for the compound excursive and protrusive swinging motions of the lower jaw relative to the upper jaw.

Figure 1:
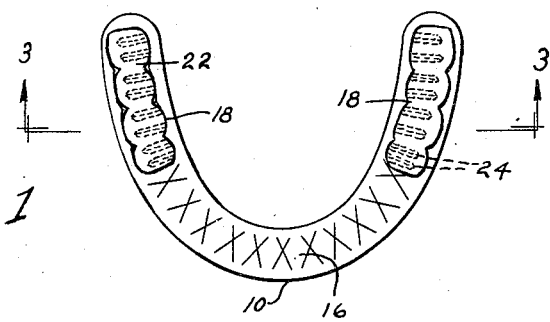
Fig. 1 is a top plan view illustrating the application of the invention.
Figure 3:
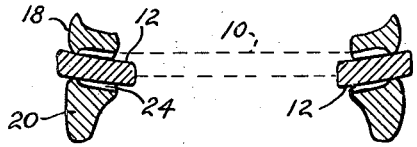
Fig. 3 is a section on line 3—3 of Fig. 1.
Figure 4:
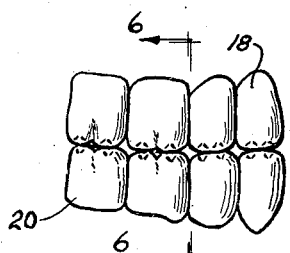
Fig. 4 is a view illustrating the bite blocks.

Hence the teeth are applied to the plate as illustrated in Figs. 1 to 3 inclusive i. e., the chewing surfaces are secured to the plate as by wax, etc., so that the teeth are arranged as finally desired. The molars being the only teeth necessary to exactly fit each other, the front teeth have been omitted from the illustration. However, all the teeth are placed as indicated on the bite plate, and then locked together, whereupon all that is necessary to be done is to fasten the locked sets of teeth to the artificial gums already determined by the plaster cast, and the teeth are finished, it being clear that the chewing surfaces be on the curves indicated thus providing for the excursion and protrusion exactly naturally without discomfort, undesirable clicking, or interference.

In order to prevent wedging or locking of the teeth between the uppers and lowers, novel "bite blocks" are provided. These blocks comprise elongated elements all in one solid piece and representing a series of teeth. The upper bite block is shown at 18 and in the present instance represents four molars which are convexly curved on the seven inch radius at their chewing surfaces as shown. The lower bite block is shown at 20 and this block is similar to the other but concavely curved complementarily to obtain the smooth sliding action necessary to all teeth.

Figures 5, 6:
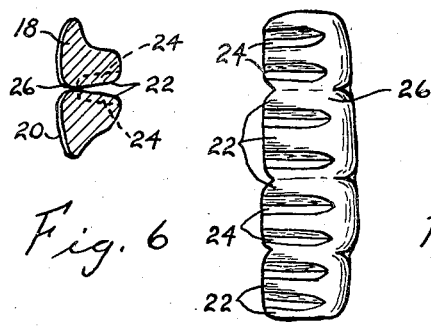
Fig. 5 is a plan view of one of the bite blocks.
Fig. 6 is a cross section on line 6—6 of Fig. 4.

At their chewing surfaces the bite blocks are provided with rounded transverse ridges 22 separated by rounded depressions 24, the latter extending from the lingual aspect toward but stopping short of the labial aspect. At the labial aspect, the blocks are plane as at 26, so that as exaggeratedly shown in Fig. 6, the teeth may slide on each other in talking and in other uses, without catching on each other or becoming wedged or locked. At the same time, the rounded contours of the mascerating ridges will not catch on each other even though in contact so that during chewing there is no interference.

The present invention clearly provides a method and means for making false dentures exactly conforming to material requirements and avoiding all clicking, catching, and interference, making for comfortable, long lasting, and satisfactory teeth with a minimum of effort and time expended in manufacture.

Having thus described my invention and the advantages thereof, I do not wish to be limited to the details herein disclosed, otherwise than as set forth in the claim, but what I claim is:

Bite block for prosthetic use comprising an elongated element substantially the length of four contiguous molars, the block having a continuous substantially straight smooth chewing edge along the labial aspect thereof and a plurality of substantially parallel short, spaced, transverse chewing grooves extending from the lingual aspect outwardly toward and terminating at the smooth edge short of the labial aspect of the block, said smooth edge and grooved area together forming the complete chewing surface of the block, said surface being slightly inclined downward and inward from the smooth edge to avoid contact of the grooves with the opposite teeth in the other jaw.

LLOYD H. BLANCHARD.

REFERENCES CITED

The following references are of record in the file of this patent:

UNITED STATES PATENTS

| Number | Name | Date |
|---|---|---|
| 990,548 | Gysi | Apr. 25, 1911 |
| 1,495,390 | Hollingsworth | May 27, 1924 |
| 2,229,780 | Vaillancourt | Jan. 28, 1941 |
| 1,692,928 | Clapp et al. | Nov. 27, 1928 |
| 1,518,075 | Kesling | Dec. 2, 1924 |
| 2,195,370 | La Due et al. | Mar. 26, 1940 |